US008985653B1

(12) United States Patent
Kest

(10) Patent No.: US 8,985,653 B1
(45) Date of Patent: Mar. 24, 2015

(54) WASTE COLLECTOR

(71) Applicant: Anthony M Kest, Boca Raton, FL (US)

(72) Inventor: Anthony M Kest, Boca Raton, FL (US)

(*) Notice: Subject to any disclaimer, the term of this patent is extended or adjusted under 35 U.S.C. 154(b) by 0 days.

(21) Appl. No.: 14/333,953

(22) Filed: Jul. 17, 2014

Related U.S. Application Data

(60) Provisional application No. 61/894,209, filed on Oct. 22, 2013.

(51) Int. Cl.
*A01K 29/00* (2006.01)
*A01K 1/01* (2006.01)

(52) U.S. Cl.
CPC .................................... *A01K 1/0114* (2013.01)
USPC .......................................................... 294/1.3

(58) Field of Classification Search
CPC ........... E01H 1/1206; E01H 2001/128; A01K 23/005
USPC ..................... 294/1.3, 1.4, 1.5, 179; 15/257.3
See application file for complete search history.

(56) References Cited

U.S. PATENT DOCUMENTS 1,987,011 A 1/1935 Kahn
4,148,510 A * 4/1979 Brack et al. .................... 294/1.3
4,149,745 A 4/1979 Willis
4,368,907 A * 1/1983 Ross ............................. 294/1.4
D334,255 S 3/1993 Nelson
5,382,063 A * 1/1995 Wesener et al. ................ 294/1.3
5,400,572 A 3/1995 Chcochinov
5,536,055 A 7/1996 Kohn
5,575,520 A * 11/1996 Northcutt ..................... 294/179
5,580,111 A 12/1996 Bohn
D387,514 S 12/1997 Savicki
5,868,447 A 2/1999 Clark
5,921,596 A 7/1999 Sheriff
6,237,973 B1 5/2001 Dupont
6,578,807 B1 6/2003 Lipscomb
D485,025 S 1/2004 Edwards
6,708,742 B2 3/2004 Weathers
6,941,896 B1 9/2005 Morin (Continued)

FOREIGN PATENT DOCUMENTS

CN 2210166 Y 10/1995

OTHER PUBLICATIONS

Amico, Red Plastic Cover Home Car Ashtray Trash Bin Can Garbage Container, Amazon, http://www.amazon.com/Plastic-Cover-Ashtray-Garbage-Container/dp/B00CFPIZV4.

(Continued)

*Primary Examiner* — Saul Rodriguez
*Assistant Examiner* — Gabriela Puig
(74) *Attorney, Agent, or Firm* — Cislo & Thomas, LLP

(57) ABSTRACT

A waste collector having a body and a scooper, the scooper having a trap door that opens in one direction to allow waste to move through the door into the body, but prevents the waste from coming back out of the body in the opposite direction, thereby securely containing the waste. The scooper is movably attached to the body to allow the scooper to be opened from the body to discard the waste. The body comprises a back door to allow the waste to be discarded through the back end. The scooper comprises a plurality of openings to allow re-usable litter to pass through while containing the waste. The body has a slot to hold a roll of bags configured to fit inside the body to give the user the option of lining the interior of the body with a bag for easier disposal of the collected waste.

17 Claims, 5 Drawing Sheets

(56) References Cited

U.S. PATENT DOCUMENTS

| | | | | |
|---|---|---|---|---|
| 7,686,360 | B2 | 3/2010 | Platt | |
| 8,459,707 | B2 | 6/2013 | Lipscomb | |
| 8,550,511 | B2 | 10/2013 | Baars | |
| 2004/0145196 | A1 | 7/2004 | Katz | |
| 2004/0188443 | A1 * | 9/2004 | Perkitny et al. | 220/495.06 |
| 2004/0189026 | A1 | 9/2004 | Aaron | |
| 2004/0256869 | A1 * | 12/2004 | Avishay | 294/1.4 |
| 2005/0184540 | A1 | 8/2005 | Graziosi | |
| 2006/0152024 | A1 | 7/2006 | Borngesser | |
| 2006/0180512 | A1 | 8/2006 | Allen | |
| 2006/0243867 | A1 | 11/2006 | Strickland | |
| 2007/0170732 | A1 * | 7/2007 | Platt | 294/1.3 |
| 2010/0281642 | A1 * | 11/2010 | Lee | 15/144.4 |
| 2011/0254296 | A1 * | 10/2011 | Chavez | 294/1.3 |
| 2012/0025549 | A1 | 2/2012 | Lipscomb | |
| 2013/0026773 | A1 | 1/2013 | Rockwell | |

OTHER PUBLICATIONS

Impact Lab, Easy Dumb Trash Can, Nov. 1, 2009, http://www.impactlab.net/2009/11/01/easy-dump-trash-can-a-revolutionary-waste-receptacle/.

Rubbermaid Commerical Products, Rubbermaid Commerical 8430-88 35-Gallon Ranger Trash Can, Square, 21-1/2" Width×21-1/2" Depth×41" Height, Black, Amazon, http://www.amazon.com/Rubbermaid-Commercial-8430-88-35-Gallon-Ranger/dp/B001L4JSUC.

Stink Free, http://www.stinkfree.com/scoop.html.

* cited by examiner 116
120
202
200
206
102
205
204
114
504
502

124
510
500
508
119
506

WASTE COLLECTOR

CROSS-REFERENCE TO RELATED APPLICATION

This patent application claims the benefit of U.S. Provisional Patent Application Ser. No. 61/894,209, entitled "Kitty Hollow Litter Scooper," filed Oct. 22, 2013, which application is incorporated in its entirety here by this reference.

TECHNICAL FIELD

This invention relates to waste scoopers, in partic scoopers for cleaning litter boxes.

BACKGROUND

Based on a national survey asking cat owners what the most frustrating part of owning a cat, cleaning the litter box with traditional scoopers and keeping the surrounding area clean was the top answer. This is not a surprise given that scientists have proven illnesses can spread from cats to humans (Zoonotic disease). As such, it is important to keep the litter box and surrounding area clean for the health of the family members and their pet.

As indicated in the survey, traditional scoopers are still frustrating to use. Some do not have an attached container; therefore, a separate trash container is required and the collected waste has to be disposed of immediately. Others utilize an external bagging system. However, this is unsanitary as the bag would sweep across the kitty litter during the collection process.

Therefore, there is still a need for a waste collection device that has been developed to offer cat owners an easier, cleaner, and healthier alternative to cleaning the litter box.

SUMMARY

The present invention is directed to waste collector, such as a scooper for kitty litter waste. The waste collector comprises a body and a scooper attached to the body. The scooper has a one-way trap door that allows waste to be scooped by the scooper and deposited into the body via the trap door. This reduces dust and smell during cleaning.

The scooper comprises holes to allow useable litter to be returned to the litter box, and works with all types of litter, even non-clumping litter. The waste collector can be used to collect more waste without the waste already contained in the body coming back out due to the trap door.

The body is large enough to handle large size clumps from large cats or multiple cats. The body may have a back door through which the waste can be removed. In some embodiments, the body can be lined with a waste bag so that the waste is collected in the bag and the bag can be discarded. This reduces the chances of touching feces when cleaning or disposing of the waste. The collected waste is easily disposed of simply by holding the waste collector over a trash can and opening a back door on the waste collector, or opening the scooper and removing the bag.

The waste collector is easy to use, designed with sharp tips for thorough cleaning, and is easy to clean. Therefore, cleaning litter boxes become less of a chore.

DETAILED DESCRIPTION OF THE INVENTION

Figure 1:
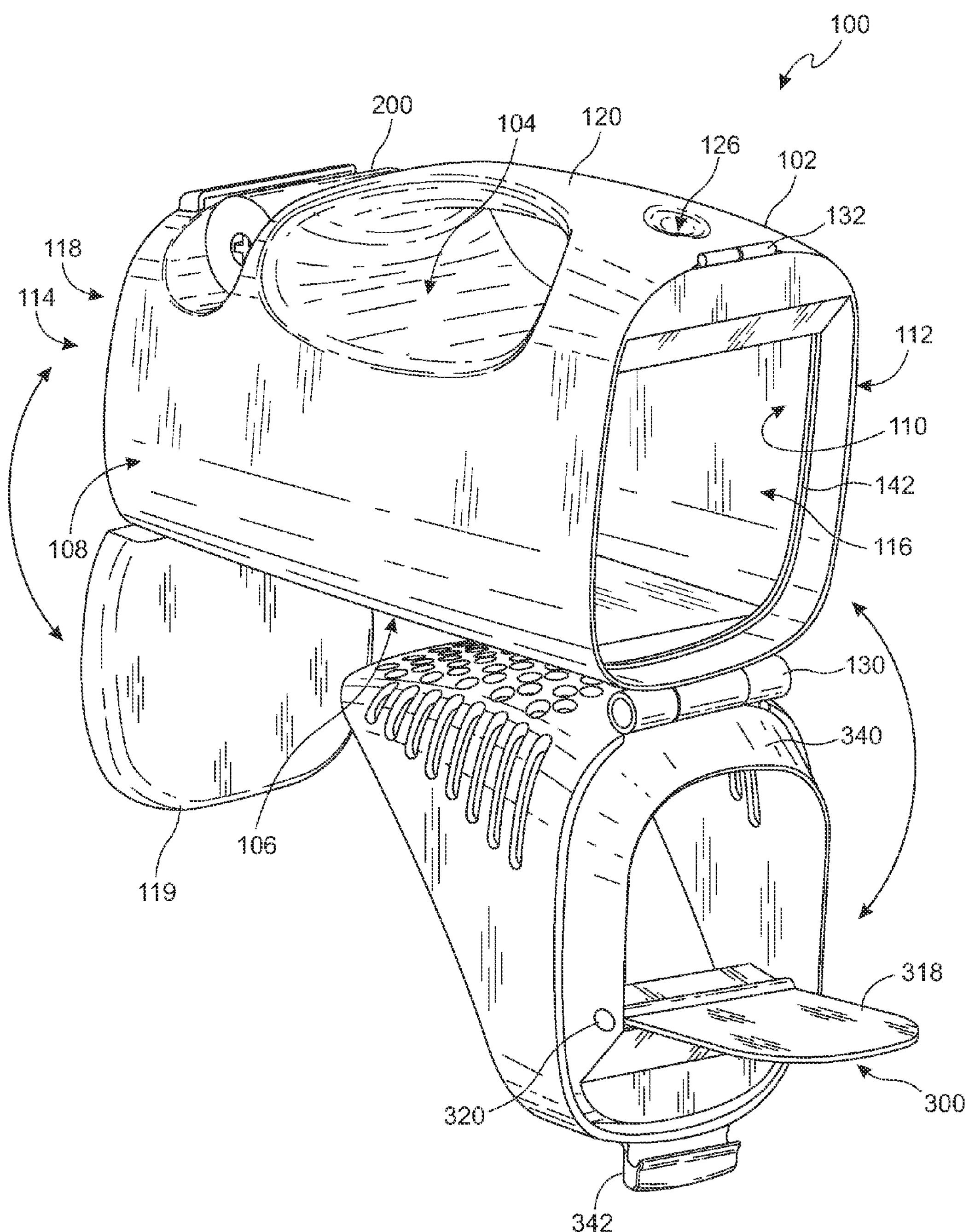
FIG. 1 shows a front perspective view of an embodiment of the waste collector in the open configuration.
Figure 2:
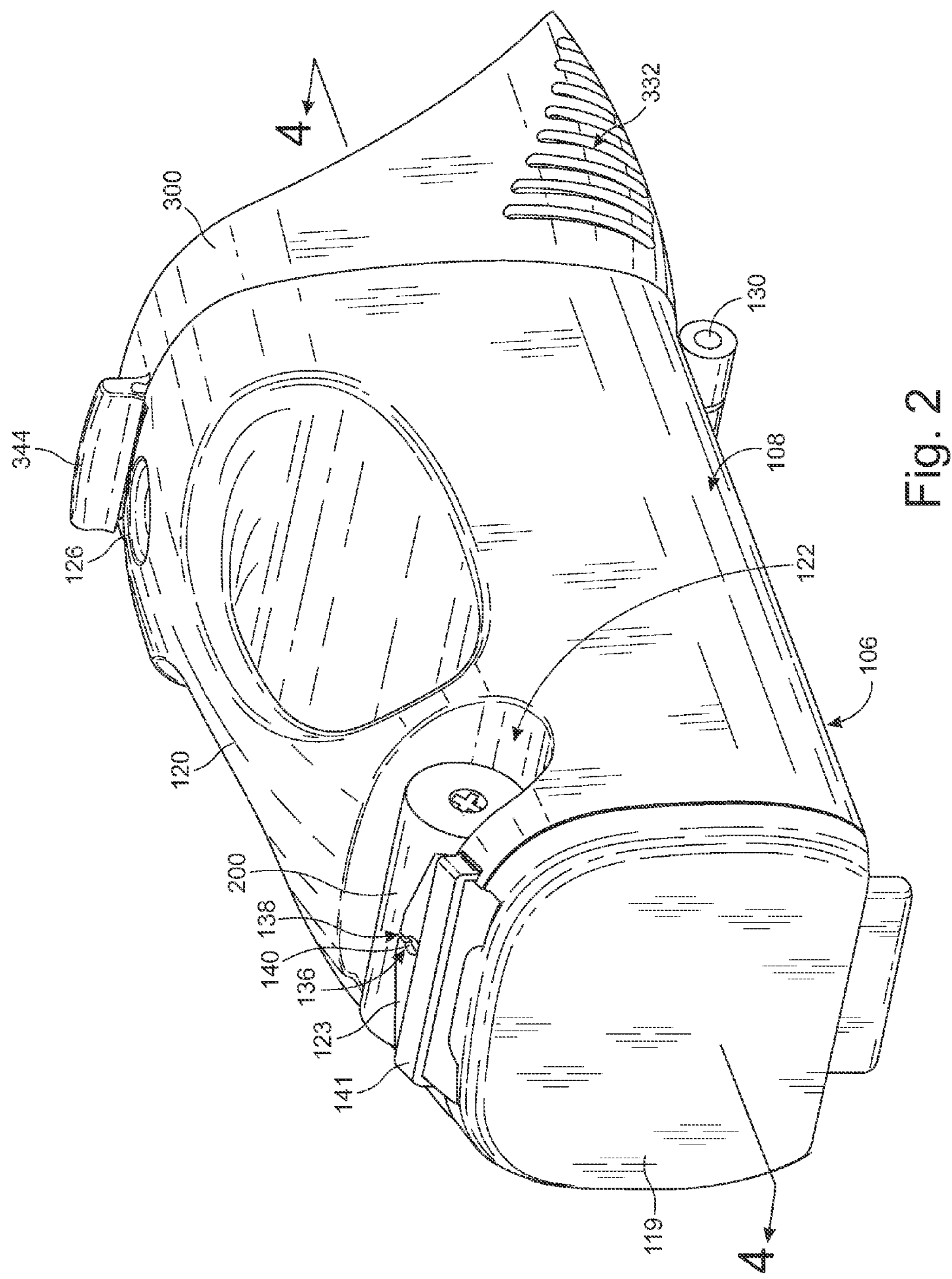
FIG. 2 shows a rear perspective view of the waste collector.
Figure 3:
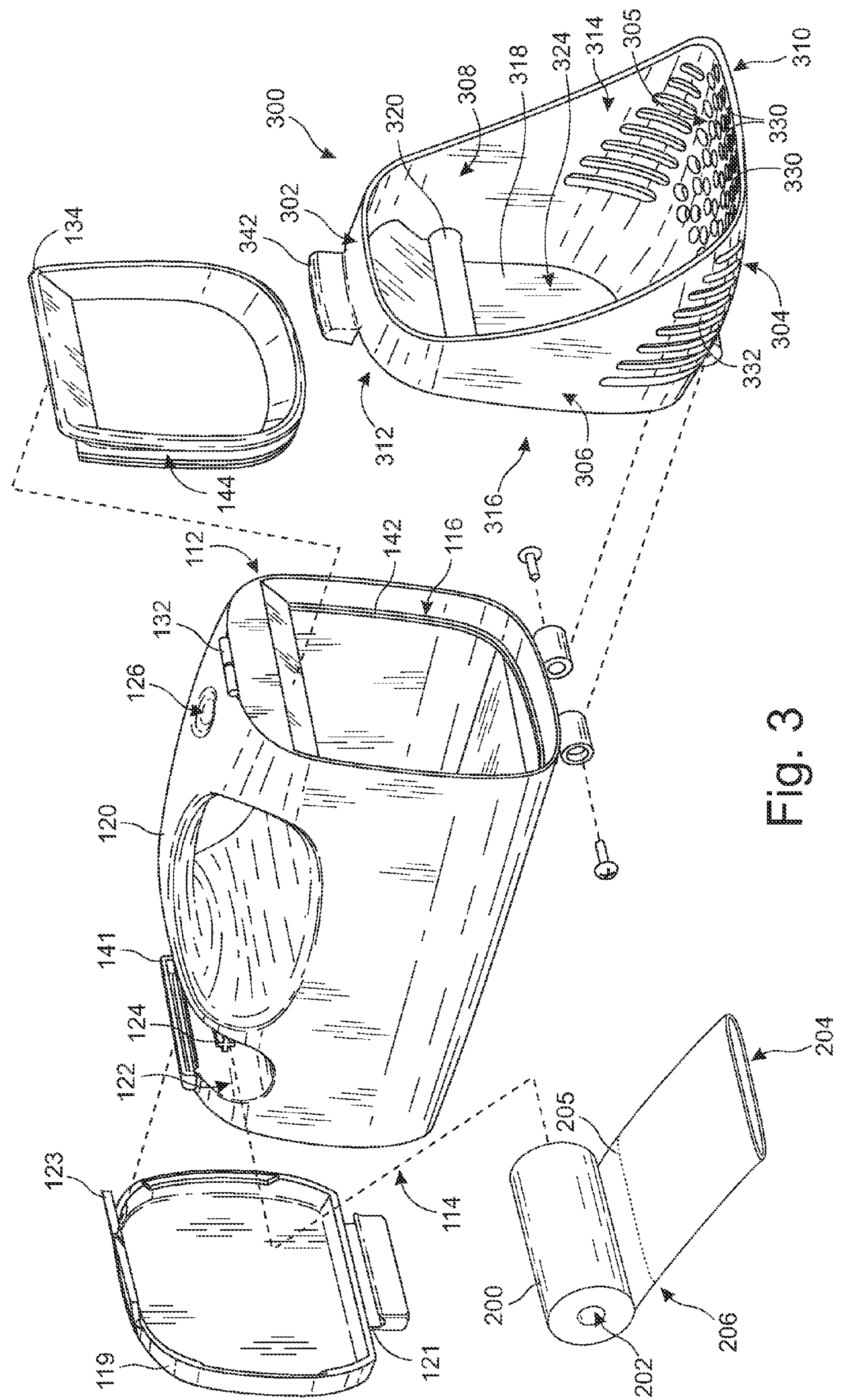
FIG. 3 shows an exploded view of the waste collector.

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

The invention of the present application is a waste collector, and more particularly, an all-in-one waste cleaning system 100, particularly useful in quickly and efficiently removing waste from a litter box, and containing the waste in a secure manner until ready for final disposal. Waste includes any undesired matter to be discarded. In a litter box, the waste may be the fecal matter from the animal or it may be clumps of litter that has trapped the urine from the animal.

With reference to FIGS. 1-4, the waste collector 100 comprises a body 102 having top side 104, a bottom side 106 opposite the top side 104, two opposing sidewalls 108, 110 adjacent to the top side 104 and bottom side 106, a front end 112, and a back end 114. The front end 112 has a first opening 116, the back end 114 has a second opening 118, and the body 102 defines a cavity therebetween. A back door 119 may be attached to the body 102 at the back end 114 to allow the back door 119 to open and close the second opening 118. In the preferred embodiment, the top side 104 has a handle 120 in between the front end 112 and the back end 114. Attached to the front end 112 is a scooper 300.

A back door 119 is movably attached to the back end 114 of the body 102 to close the second opening 118 of the body 102. In the preferred embodiment, the back door 119 is attached to the back end 114 by a hinge 121. In some embodiments, the hinge 121 is a living hinge. The hinge 121 allows the back door 119 to swing open. The door 119 may also slide open, pop open, twist open, and the like. A back latch 123 may be used to keep the back door 119 in the closed configuration. For example, adjacent to the back door 119 may be a door catch 141. The door catch 141 engages the latch 123 to prevent the back door 119 from opening. The engagement between the door catch 141 and the latch 123 may be via resistance fit, hooks, clips, magnets, and the like.

When held with the scooper 300 above the body 102 (referred to as the upright configuration), releasing the back latch 123 from the catch 141 causes the back door 119 to open due to the gravitational force. In some embodiments, the back door 119 may be spring-loaded with a spring creating a biasing force on the inner side of the back door 119. Therefore, releasing the back latch causes the spring to force the back door 119 open. The back latch 123 can be positioned either on the back door 119 or on the body 102. The catch 141 can be positioned on the other.

In some embodiments, the waste collector 100 further comprises a slot 122. Preferably, the slot 122 is on the body 102. The slot 122 can be at the back end 114 of the body 102, the front end 112 of the body 102, or anywhere therebetween.

In some embodiments, the slot 122 is located at the back end 114 of the body 102 just behind the handle 120. A rod 124 may reside within the slot 122. A plurality of bags 200 may be attached to each other and formed into a roll defining a central gap 202. The roll of bags 200 can be placed in the slot 122 with the rod 124 inserted into the central gap 202 allowing the roll of bags 200 to spin about the rod 124 when one of the bags is pulled on. The connection 205 between bags may be perforated for easy tearing to separate one bag from the other. Each bag has an open end 204 and a closed end 206, and is dimensioned to fit inside the cavity with the open end 204 adjacent to the first opening 116. Note, the bag is not drawn to scale in some figures.

In some embodiments, adjacent to the slot 122 is a bag catch 136. The bag catch 136 manages the bags 200 as they are being dispensed to prevent the bags from unraveling unnecessarily. The bag catch 136 can leave a small portion of the bag 200 exposed so that the user can easily pull on the exposed portion of the bag 200 for use while allowing the remainder of the bags to be contained. In the preferred embodiment, the bag catch 136 may be a small notch 138 on the body 102, the scooper 300, or the back door 119. The notch 138 may lead to a slightly larger hole 140 where a partially dispensed bag can be held. The notch 138 and hole 140 should be small enough to scrunch a portion of the hag that has been inserted therein. To dispense a bag, the user simply pulls on the exposed portion of the hag, which threads the remainder of the bag through the hole until the next bag is exposed. The user can then tear the first hag from the next hag for use, while the next bag remains available for the next use. The In the preferred embodiment, the bag catch 136 may be integrated into the back door 119. In particular, the bag catch 136 may be formed into the latch 123.

In some embodiments, the top side 104 of the body 102 comprises a divot 126 at the front end 112 on or adjacent to the handle 120. The handle 120 is ergonomically designed to allow a user to grasp the handle 120 and place his thumb into the divot 126 for added stability and comfort while scooping.

The interior of the body 102 comprises a large cavity defined by the walls 104, 106, 108, 110 of the body 102 and the back door 119. In some embodiments, the waste collector 100 further comprises a collar 134 positioned at the first opening 116. The collar 134 may be used as a seal or gasket to create a tight junction between the body 102 and the scooper 300. Therefore, the collar 134 may be made of plastic, rubber, silicone, and like materials. To that effect the dimensions of the collar 134 may be substantially similar to that of the first opening 116.

In some embodiments, the front opening 116 may taper slightly moving towards the back end 114. The collar 134 may have a similar tapering effect. The collar 134 can then be wedged into the front opening 116 as the dimensions of the collar 134 become too large to fit into the tapered first opening 116.

In some embodiments, adjacent to the first opening 116 may be a radially inwardly protruding lip 142 that extends along at least a portion of the periphery of the body wall 102 on the inside. The lip 142 can be used as a buttress against which the collar 134 can be sandwiched to create the tight seal between the body 102 and the scooper 300. In some embodiments, the collar 134 may have a track 144 defined along its periphery, into which the lip 142 may be seated to hold the collar 134 in place. In some embodiments, the lip 142 may be double-walled; thereby defining its own track, into which the peripheral edge of the collar 134 may be seated. Other ways of securing the collar 134 to the front 112 of the body 102 at the first opening 116 can be used.

In some embodiments, the collar 134 may be used to hold the bag 200 in place inside the cavity while in use. For example, a hag 200 having an open end 204 and a closed end 206 can be inserted into the cavity with the closed end 206 first so that the closed end 206 is positioned adjacent to the back door 119 and the open end 204 of the bag 200 is positioned adjacent to the first opening 116. Thus, the interior of the body 102 may be lined with the bag 200 with the open end 204 of the bag 200 roughly aligned with the first opening 116. The collar 134 may be inserted into the open end 204 of the hag 200 and secured in place as discussed above, thereby securing the bag 200 in the open configuration. When used properly, this allows the waste to drop into the bag 200 making it easier to discard the waste.

In another embodiment, the body 102 may comprise a clip 148 to hold the hag 200 in place in the open configuration inside the body 102. The clip 148 may be positioned on the inside of the body 102 adjacent the front end 112, in some embodiments, the clip 148 may be biased towards the walls of the body 102. The open end 204 of the bag 102 may be inserted in between the clip 148 and body wall 102 to keep the bag 200 in the open configuration. A plurality of clips 148 may be used at strategic locations (e.g. top, sides, and bottom) to assure the bag 200 maintains its open configuration.

In some embodiments, the bag 200 may simply be folded over the front end 112 of the body 102. Simply closing the scooper 300 to cover the first opening 116 would seal the bag 200 in the open configuration in between the body 102 and the scooper 300. Regardless of the method employed, the bag 200 is entirely or predominantly kept inside the body 102 within the cavity. Having the bag 200 inside the body 102 as opposed to the outside of the body 102, prevents the bag 200 from contacting the kitty litter during the scooping action. If the bag 200 was hung on the outside of the body 102, it would drag through the kitty litter contaminating the outside of the bag 102.

Figure 5:
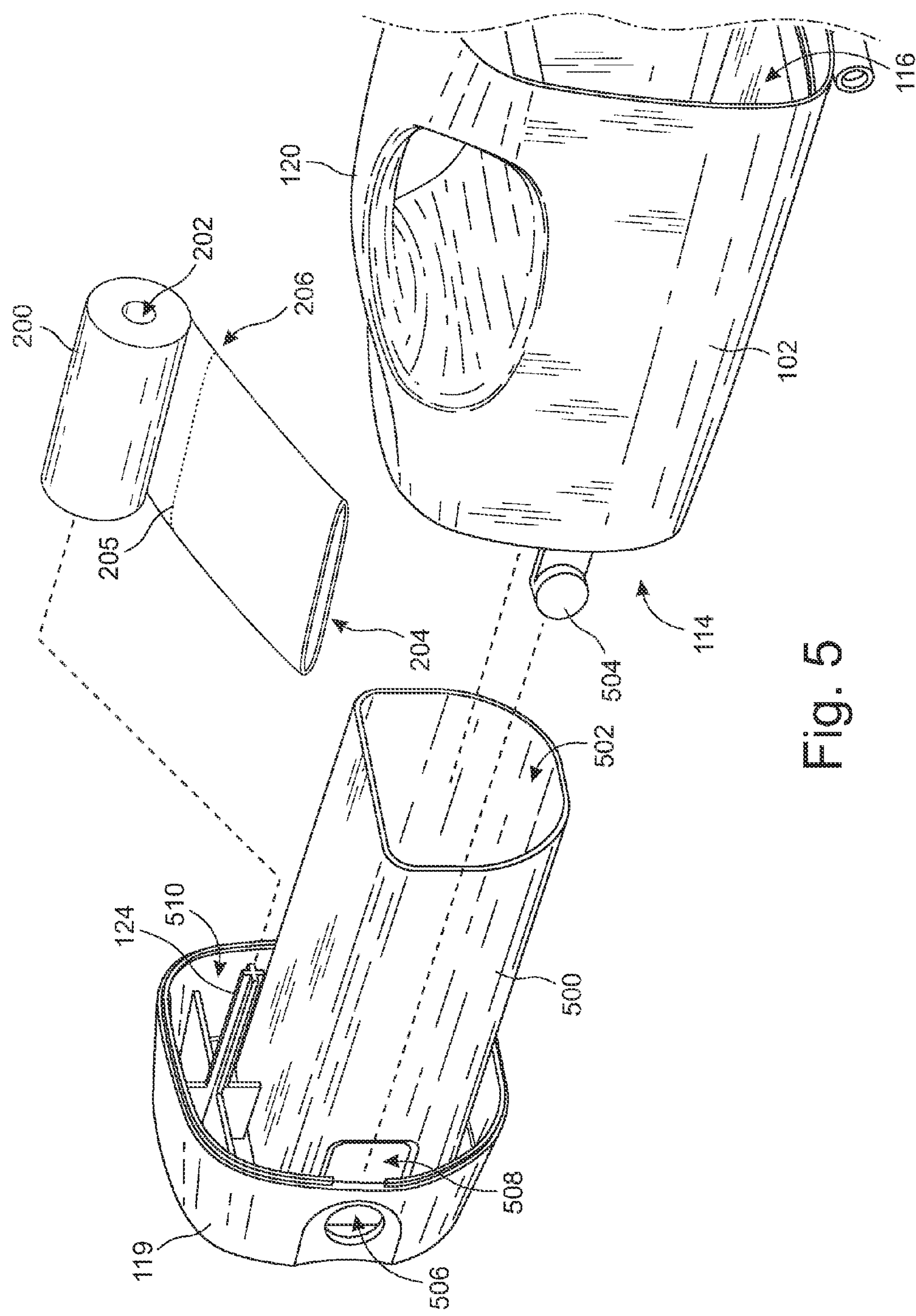
FIG. 5 shows a partial perspective view of an embodiment of the back door.

As shown in FIG. 5, in some embodiments, a secondary container 500 having an opening 502 at one end may be used in conjunction with the bag 200, or in lieu of the hag 200. The secondary container 500 is dimensioned to fit inside the body 102 by inserting it through the second opening 118 at the back end 114 of the body 102, and having the secondary container opening 502 adjacent to the first opening 116 of the body 102 when fully inserted. As waste is being collected, it falls into the secondary container 500. The secondary container 500 may be lined with the bag 200, if desired, but it is not required. When the waste collected in the secondary container 500 is ready for disposal, the user simply opens the back door 119, removes the secondary container 500, and dumps out the waste into a trash container.

In some embodiments, the secondary container 500 may be removably attached to the back door 119. In some embodiments, the secondary container 500 may be attached to the back door 119 by being integrally formed with the back door 119. As such, the back door 119 may be completely removable from the body 102. The body 102 may have a pair of release buttons 504 on opposite sides. The back door 119 may have a pair of receivers 506 on opposite sides, configured to mate with their respective release buttons 504 so as to lock the back door 119 in place. Depression of the release buttons 504 allows the back door 119 and the attached secondary container 500 to slide out from the body 102. To facilitate depression of the release buttons 504, the secondary container 500 may have recessed portions 508 adjacent to the receivers 506 to create space for the release button 504 to enter so as to be removed from the receiver 506. In some embodiments, the release buttons 504 may be on the back door 119 and the receivers 506 may be on the body 102.

In some embodiments, a pocket 510 may exist between the back door 119 and the secondary container 500. The hag 200 can be stored in the pocket 510. Therefore, after the waste is discarded, a bag 200 may be removed from the pocket 510 and placed into the secondary container 500, if desired, before returning it to the body 102. In some embodiments, the rod 124 may protrude from the pocket 510 and the bag 200 may be mounted on the rod 124. Since removal of the waste is through the back door 119, in such embodiments, the scooper 300 may be permanently attached to the body 102.

Attached to the front end 112 of the body 102 at the first opening 116 is a scooper 300. Preferably, the scooper 300 is movably attached to the front end 112 of the body 102 so as to be able to open and close the first opening 116 of the body 102. The scooper 300 has a top side 302, a bottom side 304 opposite the top side 302, and two opposing sidewalls 306, 308 adjacent to the top side 302 and the bottom side 304, a distal end 310, and a proximal end 312 opposite the distal end 310. The distal end 310 defines a front opening 314, and the proximal end 312 defines a rear opening 316 that can feed into the cavity of the body 102 through the first opening 116.

The scooper 300 further comprises a one-way door 318, referred to as a trap door. The trap door 318 is preferably positioned at or adjacent to the proximal end 312 to close the rear opening 316. Preferably, the trap door 318 opens into or towards the cavity. As such, the trap door 318 may be connected to the top side 302 of the scooper 300 by a hinge 320. In some embodiments, the trap door 318 may swing freely. In other embodiments, a spring may be operatively connected to the trap door 318 to cause the door 318 to maintain a closed configuration. The spring may apply a light, biasing force against the trap door 318, such that when light, pressure is applied to the outer side 324 of the trap door 318, the trap door 318 can move into the open configuration to create access to the cavity of the body 102.

When the waste collector 100 is held in the upright, configuration, the spring may apply just enough force to keep the door 318 closed. However, when there is waste in the scooper 300 and the waste collection device 100 is held in the upright, configuration, the waste slides onto the outer side 324 of the trap door 318 overpowering the force of the spring causing the trap door 318 to open and allowing the waste to drop into the cavity. Once the waste slides off the trap door 318 and into the cavity, the trap door 318 may automatically close. Therefore, when the user returns the waste collector 100 to a horizontal or inverted orientation to go for a second scoop, the door 318 is closed and the waste already collected is trapped inside the cavity.

In embodiments without the spring, when the waste collection device 100 is in the horizontal configuration, the trap door 318 hangs freely downwardly in the closed configuration. In the horizontal configuration the user is able to scoop up the waste. With the waste on the scooper 300, when the waste collection device 100 is held in the upright configuration, the waste slides from the scooper 300 towards the trap door 318. However, since the trap door 318 swings freely, the gravitational force is sufficient to cause the trap door 318 to open and the waste falls into the cavity. When the waste collection device 100 is returned back into the horizontal position or an inverted position to scoop up more waste, the gravitational force pulls the door 318 down into the closed configuration and the waste already in the cavity is trapped because the trap door 318 does not swing forwardly from its closed position.

In some embodiments, the trap door 318 may be trigger actuated. For example, a front latch may keep the trap door in the closed configuration. A release button may be operatively connected to the front latch. Preferably, the release button would be on the handle, for example, where the thumb or the index finger may be positioned. Depressing the release button would release the front latch allowing the trap door to open freely. Thus, with the waste collector 100 held in the upright orientation, depressing the release button would allow gravity to pull the trap door into the open configuration. The back door 119 may be similarly trigger actuated with a separate trigger.

In some embodiments, the trap door may be spring-loaded with the spring creating a biasing force against, the trap door 318 to maintain the closed configuration with the trigger being able to counteract the force of the spring. Therefore, actuating the trigger will apply force on the trap door 318 to override the spring, or the trigger may apply force directly to the spring to release its force against the trap door 318. Thus, the door 318 is either forced open by the trigger, or allowed to open by gravitational force by removing the force of the spring on the door. Releasing the trigger releases the force on the trap door 318 or on the spring, thereby allowing the spring to push the door 318 back into its closed configuration. The back door 119 may be similarly spring-loaded with its own spring.

To facilitate the scooping action, preferably, the bottom side 304 of the scooper 300 has a length L1 that is greater than a length L2 of the top side 302 of the scooper 300. Due to this configuration, the height of the sidewalls 306, 308 of the scooper 300 may taper moving from the proximal end 312 towards the distal end 310.

The bottom side 304 comprises a plurality of openings 330. The openings 330 are configured to be large enough to allow dry or re-usable litter to pass through, while being small enough to catch average-sized chunks of waste, such as fecal matter or clumps of litter that has absorbed urine. The holes 330 may be a variety of shapes and sizes. Preferably, the openings 330 are circular in shape and are dispersed throughout the bottom side 304 of the scooper 300. In some embodiments, the openings 330 may extend up the sidewalls 306, 308.

Preferably, the sidewalls 306, 308 comprise side openings, preferably in the form of elongated slots 332 that are generally perpendicular to the bottom side 304. The direction of elongation is generally from the bottom side 304 towards the top side 302. The slots 332 are generally arranged parallel to each from the distal end 310 to the proximal end 312. Preferably, the slots 332 become longer moving from the distal end 310 to the proximal end 312. This follows the tapering effect on the sidewalls 306, 308 discussed above. The width of the slots 332 are small enough to prevent waste from passing through, but large enough to allow re-useable kitty litter to pass through.

Since the bottom side 304 of the scooper 300 has an extended length L1, it may increase the flexibility of the bottom side 304. This allows the user to flex the scooper 300 so that the bottom side 106 of the body 102 of the waste collector 100 does not have to touch the kitty litter. To facilitate this action, the sidewalls 306, 308 of the scooper 300 may be lower at the distal end 310 compared to the proximal end 312. This will reduce the chances of the waste falling out the sides of the scooper 300 while allowing the scooper 300 to retain flexibility.

To further improve the capability of the scooper 300 to retain the waste, the bottom side 304 comprises a waste collection side 305 on the inner side of the scooper where the waste would be collected for sifting. The waste collection side 305 may be concave. The concavity creates a shallow bowl, which reduces the chances of waste falling out the sides or off the distal end 310. Due to the concavity, the tip 350 of the distal end 310 is higher than the rest of the waste collection side 305 when placed horizontally.

In some embodiments, the proximal end 312 of the scooper 300 may have tapered walls 340 that project inwardly and into the first opening 116 when the scooper 300 is in the closed configuration. This facilitates movement of the waste into the cavity by creating funnel. In addition, the tapered or funnel-shape, also allows the proximal end 312 to fit easily into the first opening 116 of the body 102. The proximal end 312 of the scooper 300 and the front end 112 of the body 102 create a tight fit. With the tapering of the proximal end 312, this portion of the scooper extends partially into the body 102. This reduces the chances of litter dust or waste escaping from between the front end 112 of the body 102 and the proximal end 312 of the scooper 300, particularly in conjunction with the collar 134 as discussed above. In some embodiments, the scooper 300 may cap the body 102 at the first opening 116 so as to fit around the body 102 rather than inside the body 102.

Preferably, the bottom side 304 of proximal end 312 of the scooper 300 is attached to the bottom side 106 of the front end 112 of the body 102. Thus, in order to access the cavity of the body 102, the scooper 300 may be flipped downwardly so as to rotate about a hinge 130. In some embodiments, a lock may be placed at the top side 302 of the scooper 300 and/or the top side 104 of the body 102 so as to maintain the scooper 300 in the closed configuration against the first opening 116. Preferably, this may be accomplished using a slot 342 and catch 132 so that the slot 342 and catch 132 create a resistance fit with each other. In some embodiments, the lock may further comprise a release button that must be pressed in order to allow the catch 132 to be released from the slot 342.

As discussed above, to use the waste collector 100 for cleaning a litter box, the user positions the waste collector 100 in a horizontal position (i.e. with the body 102 and the scooper 300 parallel to the ground) or slightly inverted position (i.e. with the body 102 slightly above the scooper 300), moves the waste collector 100 in a horizontal direction through the litter box containing kitty litter and waste (fecal matter and clumps of litter) such that the kitty litter and waste are scooped into the scooper 300 of the waste collector 100. The kitty litter is then sifted so that only the waste remains in the scooper 300. The user can then adjust the waste collector 100 to an upright position causing the waste to pass through the trap door 318 and into the cavity of the body 102, whereby waste is effectively removed from the litter box while useable kitty litter is returned to the litter box. The cavity of the body 102 may be lined with a bag 200 or not. Transferring the waste to the body 102 may be automatic as the trap door 318 opens due to the force of gravity or the weight of the waste. In some embodiments, the opening of the trap door 318 may be facilitated by actuating a trigger. The user can repeat the process by placing the waste collector 100 back into the horizontal or slightly inverted position to collect additional waste without the hag 200 dragging through the litter box and without the waste being released from the body 102. Since the trap door 318 remains closed in the horizontal position, the waste is completely contained in the body 102. Therefore, the waste collector 100 serves as an all-in-one litter cleaning system that not only cleans the litter box, but also contains the waste, including smell, dust, allergens, and the like, until the user is ready to dispose the waste, which can be done at a later time without leaving unsightly or odorous waste in plain view.

To remove the waste from the waste collector 100 the user simply positions the back end 114 of the waste collector 100 over a waste container and opens the back door 119 to allow the waste to drop into the waste container.

In some embodiments, the body 102 may have been lined with a bag 200. In such case, when the waste collector 100 is placed in the vertical position and the waste drops into the bag 200, the scooper 300 can be detached from the front end 112 of the body 102 and the bag removed and discarded.

In some embodiments, the back latch 123 may be positioned on the body 102. Once the waste has been collected into the body 102, the user can simply carry the waste collector 100 to a waste container, then while holding the waste collector 100 in the upright configuration, the user can place the back end 114 over the waste container and use the edge of the waste container to press against the back latch 123. This automatically opens the back door 119 and causes the waste to fall into the waste container. With the waste collector 100 being positioned over the waste container, much of the dust can be blocked from coming back out during disposal.

In some embodiments, the waste collector 100 can be sold as a kit with a specialized waste container. The waste container can be the same as any traditional waste container except that the top opening through which the waste is deposited can be configured to be substantially the same size and shape as the back end 114 of the waste collector so that the waste collector 100 can be seated on top of the waste container to create a tight fit between the waste collector 100 and the waste container. Since a tight fit is created, any dust that can escape when the waste is dumped into the waste container is further reduced. In fact, the user can simply leave the waste collector on top of the waste container as a lid for the waste container. Therefore, the waste container also serves as a storage stand for the waste collector 100. In some embodiments, this waste container bray be integrally formed with the litter box or attachable to the litter box.

In some embodiments, the waste container many be lined with a large trash bag. Due to the size constraints of the opening of the waste container, the top portion of the waste container may have to be removable from the body of the waste container so as to be able to insert and remove the trash bag.

Figure 4:
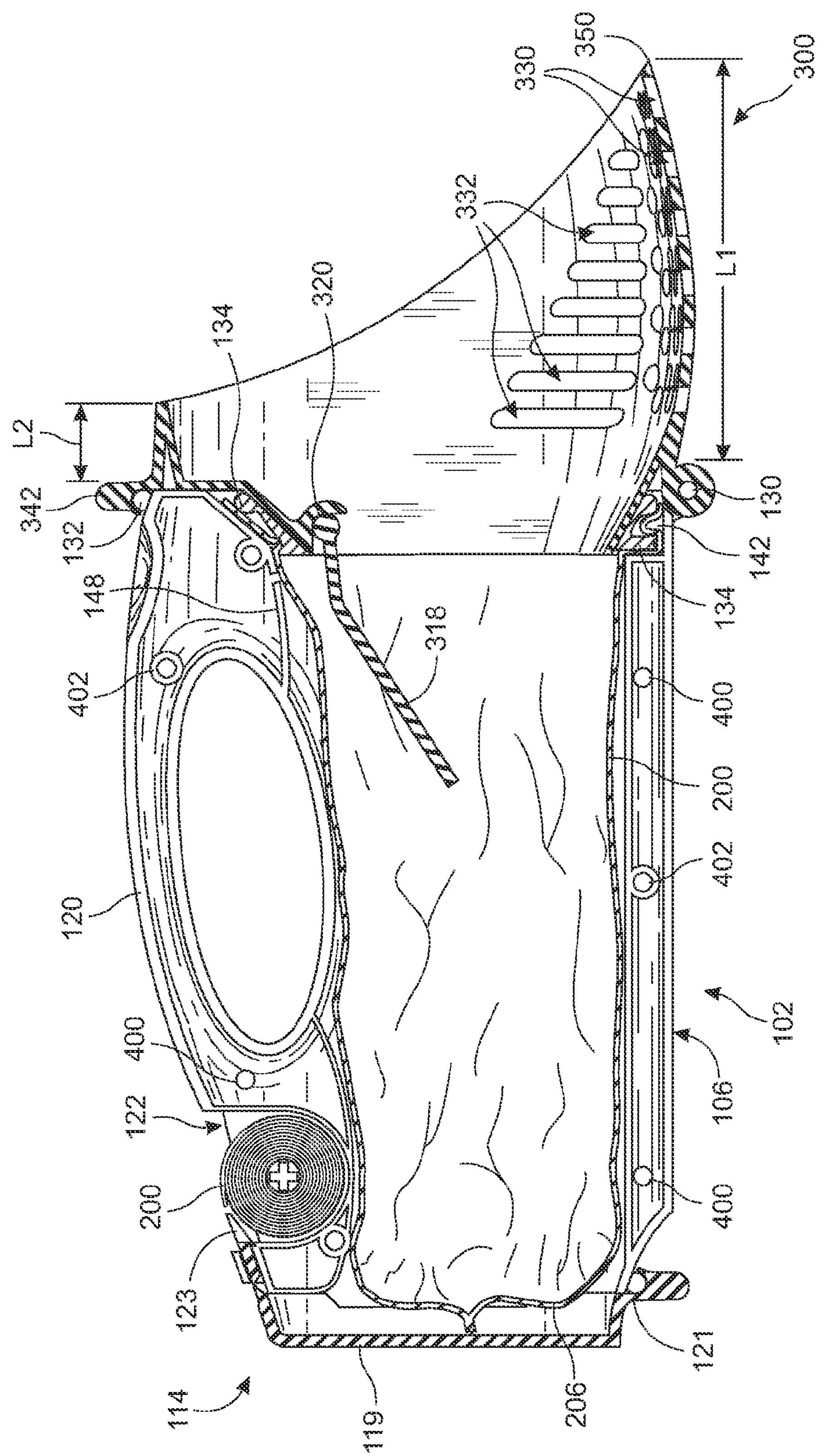
FIG. 4 shows a cross-sectional side view of the waste collector taken along line 4-4 in FIG. 2.

The waste collector 100 can be made from any rigid material, such as metal, plastic, wood, and the like, using known techniques. Preferably, the body 102 is made of two pieces cut longitudinally in half as shown in FIG. 4 that can be snap-fit together. This allows the body 102 to be disassembled for cleaning. Each half clay have a plurality of pins 400 or receivers 402. Proper alignment of the two halves allows the each pin 400 to align with one receiver 402 for a snap-fit or resistance-fit.

The foregoing description of the preferred embodiment of the invention has been presented for the purposes of illustration and description. It is not, intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

What is claimed is:

1. A waste collector, comprising:

a. a body having top side, a bottom side opposite the top side, a front end and a back end, the front end having a first opening, the back end having a second opening, the body defining a cavity therebetween, the top side comprising a divot at the front end, a slot at the back end, and a handle therebetween;

b. a back door movably attached to the back end of the body to close the second opening of the body, the back door comprising a back latch to keep the second opening closed, the latch comprising a bag catch;

c. a collar attached to an inner side of the body adjacent to the front end;

d. a roll of bags positioned within the slot of the body, the roll of bags comprising a plurality of bags removably attached to one another, each bag comprising an open end and a closed end, wherein each bag is configured to fit inside the cavity with the open end of the bag disposed around the first opening in an open configuration to receive waste; and e. a scooper movably attached to the front end of the body to close the first opening of the body, the scooper comprising:

i. a distal end and a proximal end opposite the distal end, the distal end defining a front opening, and the proximal end comprising a rear opening, ii. a trap door between the front opening and the rear opening, the trap door openable in a single direction into the body by gravitational force, iii. a top side, a bottom side opposite the top side, and opposing sidewalls, wherein the bottom side has a length greater than a length of the top side, wherein the bottom side comprises a plurality of bottom opening, and wherein the opposing sidewalls comprise a plurality of side openings.

2. A waste collector, comprising:

a. a body having a top side, a bottom side opposite the top side, a front end and a back end, the front end having a first opening, the back end having a second opening, the body defining a cavity between the first opening and the second opening, the top side comprising a handle;

b. a back door movably attached to the back end of the body to close the second opening of the body; and c. a scooper movably attached to the front end of the body to have a closed configuration and an open configuration, the scooper comprising:

i. a distal end and a proximal end opposite the distal end, the distal end defining a front opening, and the proximal end defining a rear opening, the proximal end attached to the front end of the body by a hinge, ii. a top side, a bottom side opposite the top side, and opposing sidewalls, wherein the bottom side has a length greater than a length of the top side, wherein the bottom side comprises a plurality of openings, and iii. a door in between the front opening and the rear opening, the door openable in a single direction to allow passage of waste into the body.

3. The waste collector of claim 2, further comprising a collar attached to an inner side of the body adjacent to the front end.

4. The waste collector of claim 2, wherein the body comprises:

a. a slot; and b. a rod within the slot.

5. The waste collector of claim 4, further comprising a roll of bags held by the rod within the slot of the body, the roll of bags comprising a plurality of bags removably attached to one another, each hag comprising an open end and a closed end, wherein each bag is configured to fit inside the cavity with the open end disposed around the first end.

6. The waste collector of claim 2, wherein the proximal end of the scooper comprises a tapering away from the distal end and into the body when in the closed configuration.

7. The waste collector of claim 2, wherein the top side of the body comprises a divot, at the front end.

8. The waste collector of claim 2, wherein the back door comprises a back latch to keep the second opening closed.

9. The waste collector of claim 8, wherein the back latch comprises a bag catch.

10. The waste collector of claim 2, wherein the opposing sidewalls of the scooper each comprise a plurality of side openings.

11. The waste collector of claim 10, wherein the side openings are elongated slots parallel to one another and perpendicular to the bottom side.

12. The waste collector of claim 11, wherein each elongated slot becomes progressively longer moving from the distal end to the proximal end.

13. The waste collector of claim 2, wherein the bottom side comprises a waste collection side on an inner side of the scooper, wherein the waste collection side is concave in shape.

14. The waste collector of claim 2, wherein the back door comprises a secondary container to catch and contain the waste.

15. A method of cleaning a litter box, comprising:

a. positioning a waste collector in a horizontal position, the waste collector comprising a body and a scooper attached to the body;

b. moving the waste collector in a horizontal direction through a litter box containing kitty litter and waste such that the kitty litter and waste are scooped into the scooper of the waste collector;

c. sifting the kitty litter so that only the waste remains in the scooper;

d. adjusting the waste collector to an upright configuration causing the waste to pass through a trap door, whereby the waste is effectively removed from the litter box and into the body of the waste collector; e. wherein the waste collector further comprises a bag inside the waste collector, wherein when the waste collector is placed in the upright configuration, the waste drops into the bag; f. releasing the scooper from the body; g. removing the bag from the body to discard the waste; h. pulling a new bag out from a slot on the body of the waste collector; i. placing the new bag inside the body of the waste collector; and j. reattaching the scooper onto the body of the waste collector.

16. The method of claim 15, further comprising the step of opening a back door to remove the waste from the waste collector.

17. The method of claim 15, further comprising placing the waste collector back into the horizontal position to collect additional fecal matter without the bag dragging through the litter box and without the waste being released from the waste collector.

* * * * *